FIG. 2

INVENTORS
WILLIAM J. GREENE
NEIL J. NORMANDO
BY Edmund W Bopp
Agent

FIG. 3

INVENTORS
WILLIAM J. GREENE
NEIL J. NORMANDO
BY Edmund W Bopp
Agent

FIG. 4

INVENTORS
WILLIAM J. GREENE
NEIL J. NORMANDO
BY Edmund W. Bopp
Agent

May 2, 1967  N. J. NORMANDO ET AL  3,317,811
PROGRAMMABLE FREQUENCY MULTIPLIED SQUARE WAVE POWER SUPPLY
Filed April 10, 1964

INVENTORS
WILLIAM J. GREENE
NEIL J. NORMANDO
BY Edmund W Bopp
Agent

United States Patent Office 3,317,811
Patented May 2, 1967

3,317,811
PROGRAMMABLE FREQUENCY MULTIPLIED
SQUARE WAVE POWER SUPPLY
Neil J. Normando, Livingston, and William J. Greene, Bound Brook, N.J., assignors to Air Reduction Company, Incorporated, New York, N.Y., a corporation of New York
Filed Apr. 10, 1964, Ser. No. 358,730
9 Claims. (Cl. 321—7)

Our invention relates to a regulated alternating current power supply deriving its power from conventional power lines and delivering it in substantially square wave form at a frequency several times the usual power line frequency and controllable in amplitude as a function of time to follow a variety of desired programs of current or voltage variation as represented by a given demand signal wave or program wave.

Advantages of the disclosed system over available regulated alternating current supply devices include the following:

(1) A constant current type of volt-ampere characteristic which provides better regulation with respect to power line and load variations.

(2) Substantial elimination of need for high frequency stabilization.

(3) Square-wave type current output, providing more uniform power flow into the load, that is, reduced ripple at power frequency and harmonics thereof. This is of particular importance in alternating current welding wherein it avoids the necessity of introducing high or radio frequency stabilization to keep the arc from being extinguished during intervals in which the alternating current supplied to the arc is crossing through zero value.

(4) Programmable control of output power at kilowatt levels by means of a control or program wave source operating at microwatt levels, a feature particularly useful in automatic welding among other applications.

(5) High speed of response of load current to demand for current changes, providing complete response for example in about three to six cycles of a 60 cycle per second power source, using a frequency multiplication of three times.

(6) Use of current-balancing saturable reactors to variably limit and thus program the multiplier primary current.

(7) Improved current feedback, either from the actual load current or from a direct current control loop, or both.

(8) Convenient convertibility to direct current power output, if desired, by merely adding a rectifier, thereby providing a regulated A.C.-D.C. power supply.

A feature of the invention is a unitary power wave modifying means arranged to perform the several functions of frequency multiplication, conversion of a polyphase power wave to a single phase power wave, wave form squaring and amplitude control, to produce a substantially square wave of multiplied frequency and programmable amplitude.

Another feature is a novel combination of saturable core transformers divided into two distinct groups. one of which performs primarily the function of frequency multiplication and another of which serves primarily to vary the power output of the frequency multiplying group in a continuous manner under the control of a variable control current.

A further feature of one embodiment of the invention is an arrangement for varying the said control current in accordance with variations in a given demand wave or program wave, comprising a full wave rectifier for generating the variable control current, a firing circuit for varying the firing time of rectifying elements in the rectifier, means to measure the control current, means to compare the amplitude of the control current continuously with the variable amplitude of the given program wave to generate an error signal and means to control the said firing circuit by means of the said error signal.

A further feature of the invention is an inherent suppression of ripples at an undesired harmonic of the power line frequency, for example at 120 cycles per second in the case of a 60 cycle per second power line, permitting the use of smaller and less expensive choke coils for ripple suppression.

Other objects, features and advantages will appear from the following more detailed description of illustrative embodiments of the invention, which will now be given in conjunction with the accompanying drawings.

In the drawings,

FIG. 5 is a schematic diagram of an arrangement of comparison amplifiers for controlling the output amplitude of a firing circuit such as that shown in FIG. 4 in response to a program wave;

FIG. 6 is a diagram showing how FIGS. 2 through 5 are to be arranged to form together the schematic diagram of an illustrative system in accordance with the invention;

Figure 1:
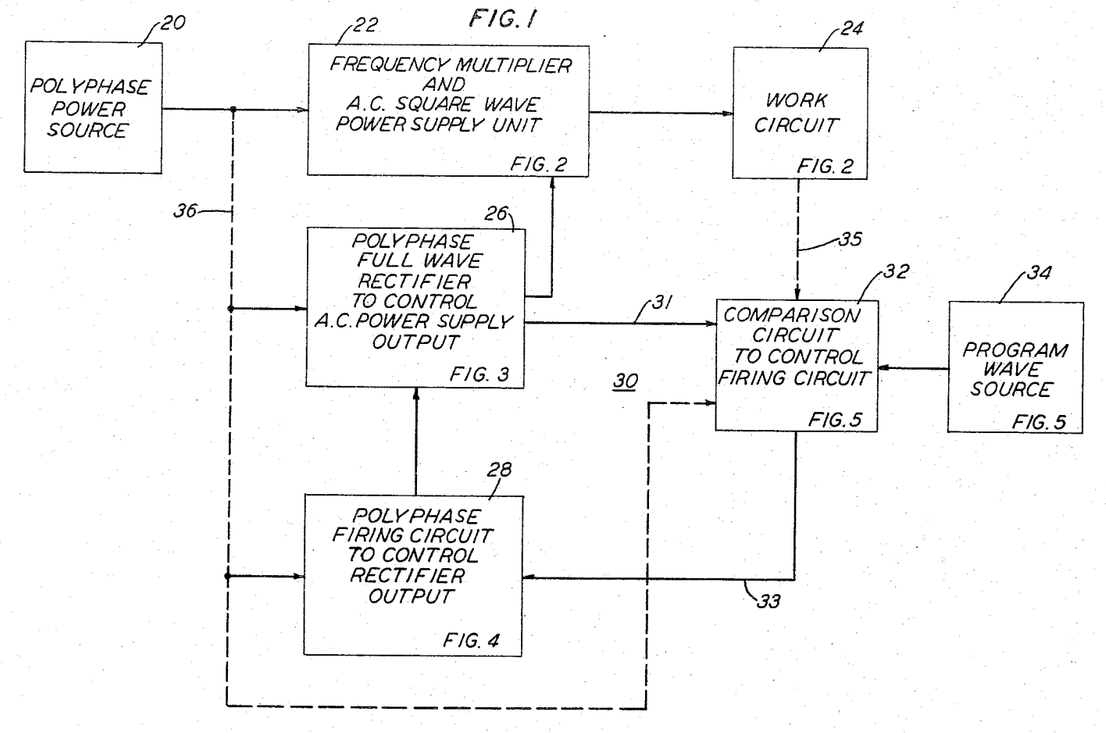
FIG. 1 is a block diagram and flow sheet for an illustrative embodiment of the invention.

FIG. 1 shows the general arrangement of an illustrative system according to the present invention. A polyphase power source 20 delivers alternating current power to a power supply unit 22 which multiplies the frequency of the polyphase power waves and shapes the waves into approximately square wave form in which they are used to operate a connected work circuit 24. The amplitude of the output of the power supply unit 22 is continuously controlled by means of a polyphase rectifier 26 which in turn is controlled by a polyphase firing circuit 28. A feedback loop 30 takes a sample wave substantially proportional to the output wave of the rectifier 26 over a line 31, compares it in amplitude in a comparison circuit 32 with a program wave from a program wave source 34 and supplies a control or error wave over a line 33 in negative feedback relationship to the firing circuit 28 which constitutes a control circuit to control the timing of the firing circuit 28 and in turn to control the output amplitude of the rectifier 26 to make the output amplitude of the rectifier 26 substantially continuously proportional to the amplitude of the program wave from source 34. The output of the rectifier 26 is used to control the power output of the power supply unit 22 to render the latter likewise continuously proportional to the amplitude of the program wave. A conventional power distribution system, represented schematically by a broken line 36, distributes power from the source 20 to the units 26, 28 and 32.

An alternative feedback path 35 is shown carrying a sample wave derived from the work circuit 24 to the comparison circuit 32, to directly reflect changes in the load current in the work circuit.

Figure 2:
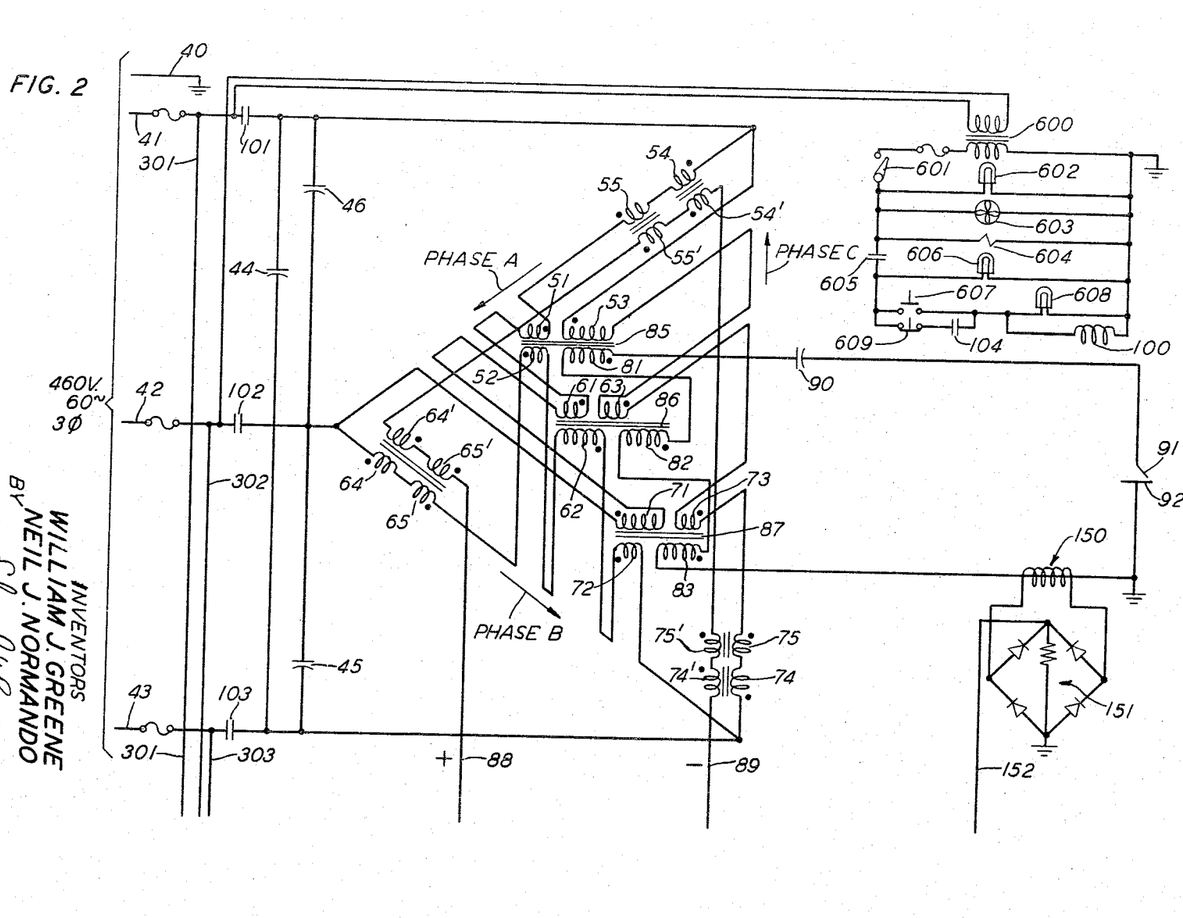
FIG. 2 is a schematic diagram of a polyphase frequency multiplier and alternating current square wave power supply unit shown connected to a work circuit in the specific form of an alternating current electric arc welding circuit, together with illustrative starting and stopping arrangements for controlling a welding operation.

FIG. 2 shows illustrative form of frequency multiplier and alternating current square wave power supply unit. The conductors of a three phase power line are shown at 41, 42 and 43, respectively, and neutral line 40, connected through relay operated closable contacts 101, 102 and 103, respectively, to an assemblage of transformer windings each coupled to one of a plurality of saturable magnetic cores, certain of which windings are connected together in delta configuration, constituting delta phases designated in the figure as phases A, B and C, respectively, with conventional power factor correcting capacitors 44, 45 and 46 connected across the respective arms of the delta. Each of the saturable magnetic cores is coupled to two or more windings. Of the windings on the same core, one or more may be opposed in polarity to the others.

To show the respective polarities of the windings of any given transformer, one end of each winding is dotted in the drawing in accordance with a convention that each winding is wound upon the core of the transformer in such direction that a current entering the winding at the dotted end will set up magnetic flux in the core in the same direction as will a current entering any other winding of the same transformer at the dotted end of the respective winding. From the information afforded by the dot convention, the combined effect of currents in the several windings of a transformer upon the resultant magnetic flux in the core of the transformer may be deduced in known manner.

In phase A are connected in series with each other a power primary winding 71 of N turns, power primary windings 61 and 51 of ½N turns each, and current limiting windings 54 and 55. In phase B are connected in series with each other a power primary winding 62 of N turns, power primary windings 52 and 72 of ½N turns each, and current limiting windings 64 and 65. In phase C are connected in series with each other a power primary winding 53 of N turns, power primary windings 73 and 63 of ½N turns each, and current limiting windings 74 and 75.

The power primary windings enumerated above are divided among three single-phase power transformers having saturable cores 85, 86 and 87, respectively, each transformer having a power primary winding from each of the phases A, B and C. Core 85 couples the power primary windings 51, 52, 53 and a power secondary winding 81. Core 86 couples the power primary windings 61, 62, 63 and a power secondary winding 82. Core 87 couples the power primary windings 71, 72, 73 and a power secondary winding 83. The power secondary windings 81, 82, 83 are connected in series aiding relation with each other and the load circuit. The current limiting windings are wound upon individual magnetic cores to form separate transformers which include individual direct current control windings 54', 55', 64', 65', 74', 75', respectively, which control windings are connected in series with each other and with control current supply leads 88 and 89. The polarities of the connections of all the windings are shown by the dot convention. All the transformer cores are of the sharply saturable variety.

The three power secondary windings 81, 82, 83 are connected in like polarity to each other in a series circuit through a balancing-wave capacitor 90 to a work circuit illustrated as an electric arc electrode 91 and a grounded workpiece 92.

FIG. 2 shows in addition starting, stopping and indicating circuits for controlling the system as a whole. These features will be described subsequently.

Figure 3:
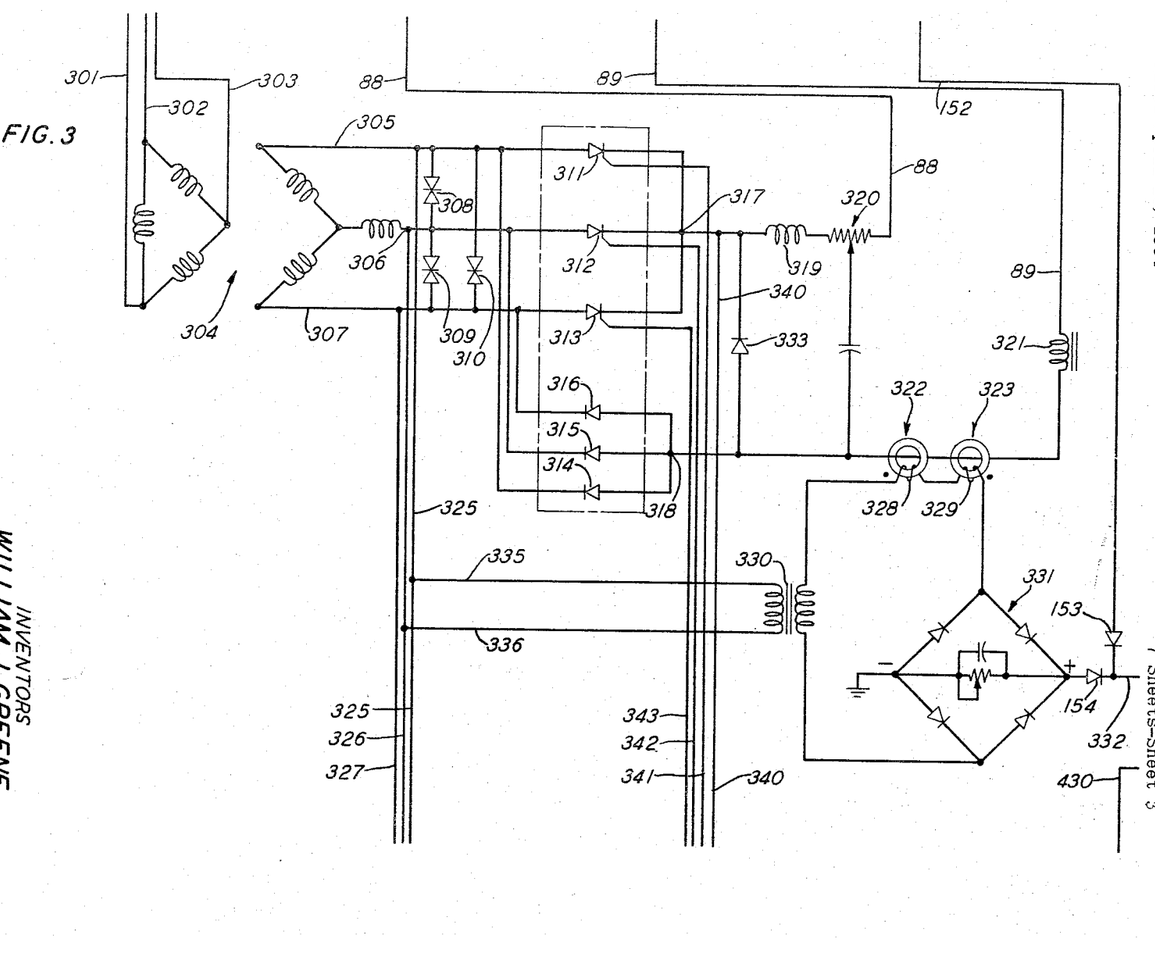
FIG. 3 is a schematic diagram of a polyphase full wave rectifier for controlling the output amplitude of a power source such as that shown in FIG. 2.

FIG. 3 shows an illustrative form of polyphase full wave rectifier for suppling direct current control current to the conductors 88 and 89 which extend into FIG. 2, as above described. Three-phase power is brought from lines 41, 42 and 43 in FIG. 2 over conductors 301, 302 and 303, respectively, to a voltage step-down transformer 304, which may have delta connected primary windings and wye connected secondary windings, as shown, although other suitable connections may be used instead. To the secondary side of the transformer 304 are connected phase lines 305, 306 and 307, as shown. Protective devices such as thyrector diodes 308, 309 and 310 may be connected for example in delta connection, as shown, across the line pairs 305, 306; 306, 307; and 307, 305; respectively.

The phase lines 305, 306 and 307 are connected together to a common point 317 by way of like poled silicon controlled rectifiers 311, 312 and 313, respectively, the point 137 being connected through a choke coil 319 and a potentiometer winding 320 to the positive direct current conductor or lead 88, the poling of the rectifiers being appropriate to pass current in the positive direction to the conductor 88. The phase lines 305, 306 and 307 are connected for negative direct current to a common point 318 by way of like poled silicon rectifiers 314, 315 and 316, which may be of the non-controlled variety, and which are so poled as to pass current toward the lines 305, 306, 307. The negative direct current conductor or lead 89 is connected by way of a ripple suppression choke coil 321 and the single turn primary windings of a pair of saturable core transformers 322 and 323 to the point 318.

To provide a current path at all times for current through the choke coil 319 even when none of the silicon controlled rectifiers 311–316 is conducting, a rectifier 333 is provided between the points 317 and 318 in the polarity shown.

Figure 4:
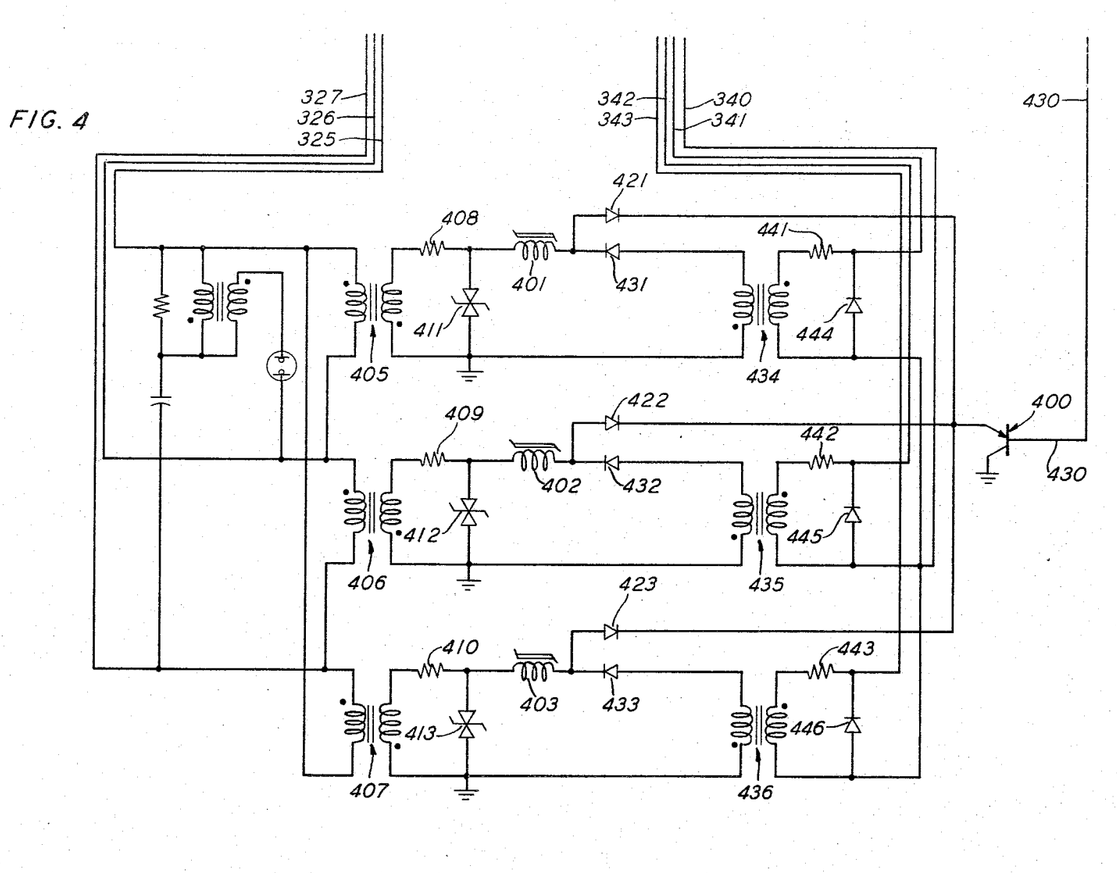
FIG. 4 is a schematic diagram of a polyphase firing circuit for controlling the output amplitude of a rectifier such as that shown in FIG. 3.

Control potentials for the silicon controlled rectifiers 311, 312, 313, are applied from the firing circuit of FIG. 4 between a common conductor 340 connected to point 317 and individual conductors 341, 342, 343, connected to the control terminals of the rectifiers 311, 312 and 313, respectively.

The ripple suppression choke coil 321 helps to maintain a flat topped output wave to the work circuit by smoothing out ripples in the control current furnished to the current limiting saturable transformers 54–54', 55–55', etc., over the lies 88, 89. For optimum ripple suppression, the coil 321 should have large inductance. On the other hand, the more inductance in the coil 321, the less rapidly the system can respond to a demand for a change in output current to the work circuit. Therefore, a suitable compromise should be made in selecting the inductance of the coil 321 to obtain the desired balance between response time in programming and flatness of the output wave.

To measure the amplitude of the control direct current flowing in the single turn primary windings of the transformers 322 and 323, single phase alternating current is supplied to the secondary windings 328 and 329, respectively, of these transformers, as by way of phase lines 325 and 335 connected to phase lines 305, and by way of phase lines 326 and 336 connected to phase line 306. This single phase current after going through a transformer 330 goes through the secondary windings 328 and 329 in opposing relation as shown by the dot convention, and thence through a full wave rectifiers 331. The direct current output from the rectifier 331 is taken off through a conductor 332 to a potentiometer 516 in the comparison amplifiers to be described later in connection with FIG. 5.

The rectifier 331 produces in the potentiometer 516 (FIG. 5) a voltage substantially proportional to the current in the serially connected primary windings of the transformers 322 and 323. The secondary windings of the transformers 322 and 323 are relatively so poled that when the alternating current in transformer 322 is instantaneously in such phase as to desaturate the core of that transformer, the current in the transformer 323 is in such phase as to drive the latter's core further into saturation. In the following half cycle of the alternating current, the current in transformer 322 is in such phase to drive its core further into saturation while the current in the transformer 323 is in such phase as to desaturate the latter's core. At all times the current in the transformers 322 and 323 is limited by whichever core is unsaturated to a value determined by the law of equal ampere-turns, which value is proportional to the current in the primary windings.

FIG. 4 shows an illustrative form of firing circuit for firing the silicon controlled rectifiers 311, 312 and 313 shown in FIG. 3. Three phase power for energizing the firing circuit is obtained from the phase lines 325, 326, 327, and is impressed upon saturable reactors 401, 402, 403, connected in delta configuration by way of transformers 405, 406 and 407, respectively. Each phase may have a squaring circuit consisting of series resistors 408, 409 and 410, respectively, and Zener voltage limiting diodes 411, 412, 413, respectively.

Figures 5, 6:
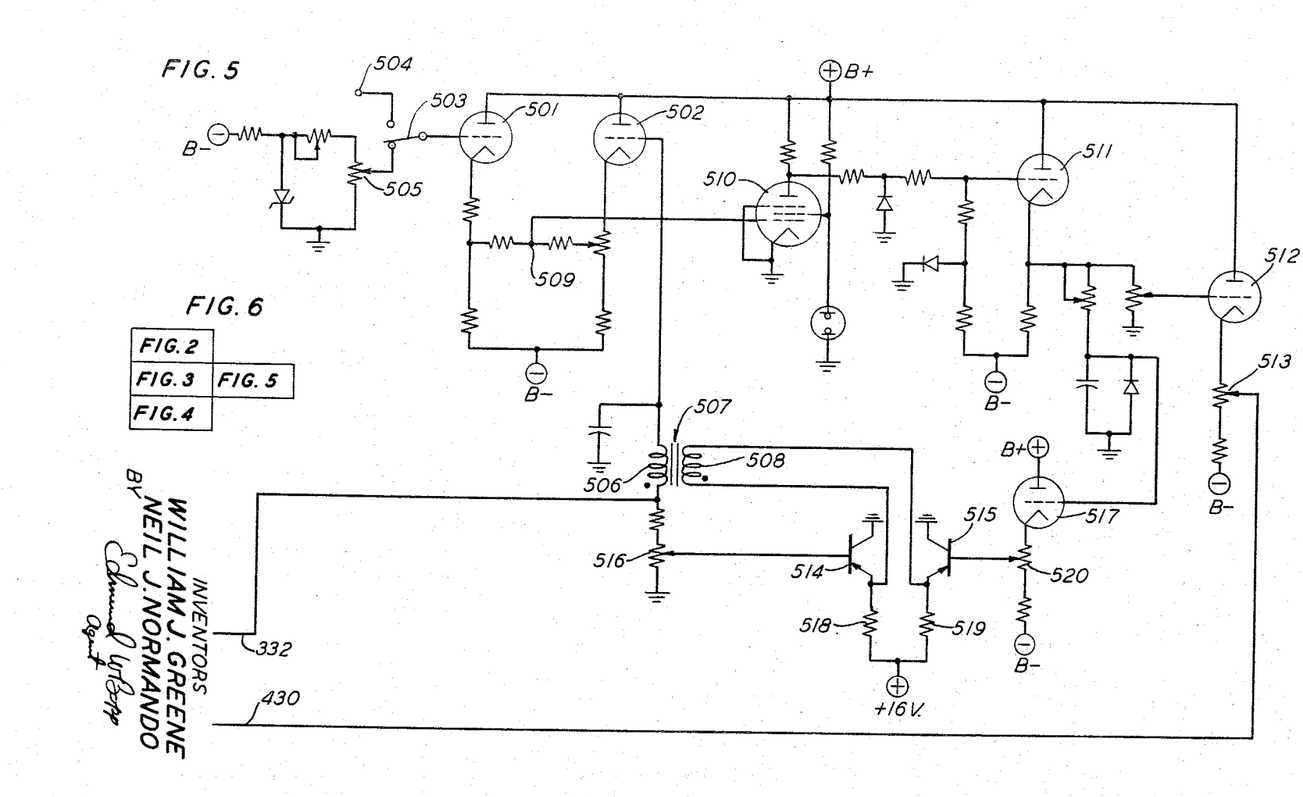

Transformer 405 when energized in one polarity, sends a current upward through the secondary winding thereof as represented in the figure, thence through the resistor 408 and the saturable reactor 401, and thence through a rectifier 421 and the emitter-colector path of a transistor 400, and returning through ground to the transformer secondary winding, thus establishing a certain residual flux in the saturable reactor 401 in an amount which is under the control of the transistor 400, and more particularly under the control of the base electrode of the transistor 400 to which is connected a conductor 430 coming in from the comparison amplifier shown in FIG. 5.

Transformer 405 when energized in the reverse polarity, sends a current downward through the secondary winding thereof as represented in the figure, thence through the primary winding of a transformer 434, a rectifier 431, the saturable reactor 401 and the resistor 408 back to the secondary winding of the transformer 405, causing a pulse to be impressed upon the primary winding of transformer 434, the start of which pulse is delayed in time by an interval varying according to the setting made in the saturable reactor 401 by the current which passed through the reactor in the other direction during the previous half cycle. This pulse is transmitted through the transformer 434 and conductors 340 and 341 to supply a firing pulse to the silicon controlled rectifier 311. In series with the conductor 341 may be a protective resistor 441 and protection against reverse current may be had by means of a rectifier 444 connected between the conductors 340 and 342 in the polarity shown in the figure.

Similar circuits are shown for the other two phases, employing across the phase lines 326 and 327 a transformer 406, a saturable reactor 402, a transformer 435, and conductors 340 and 342 to apply a firing pulse to the control terminal of the silicon controlled rectifier 312; and across the phase lines 327 and 325 a transformer 407, a saturable reactor 403, a transformer 436, and conductors 340 and 343 to impress a firing pulse upon the control terminal of the silicon controlled rectifier 313. Rectifiers 422 and 432 are provided for switching the currents for the reactor 402 and rectifiers 423 and 433 for the reactor 403. Corresponding squaring circuit resistors 409, 410; voltage limiting diodes 412, 413; protective resistors 442, 443; reverse current protective rectifiers 445, 446, are also provided as shown. The currents from the rectifiers 421, 422 and 423 are combined in the emitter-collector circuit of the transistor 400.

FIG. 5 shows an illustrative form of comparison amplifier arrangement for use in the system shown in FIG. 1. The main comparison device comprises a pair of triodes 501 and 502. A switch 503 permits a choice of program voltage wave to be impressed upon the grid electrode of the triode 501. A program wave from an external source may be impressed upon one contact of the switch 503 by way of a terminal 504. A constant but adjustable voltage may be impressed upon another contact of the switch 503 by means of a potentiometer 505. Voltage supplies for the comparison circuits shown in FIG. 5 may be provided in known manner, as for example by means of rectifiers energized from the same power lines that energize the circuits of FIGS. 2, 3 and 4. The points of application of the supply voltages in the circuit of FIG. 5 are designated B+, which may for example be +150 volts, B−, which may be −150 volts; and +16 volts at a point indicated. Other voltage values as required by the particular circuit components employed may of course be used instead of those shown. The positive and negative voltage supplies should have a common ground connection between them, which ground is indicated symbolically at various points in the schematic diagram of FIG. 5. This ground may be connected to the neutral power line 40. The potentiometer 505 may be energized as shown, by connection between B− and ground.

The feedback voltage on the conductor 332 is impressed by way of one winding 506 of a transformer 507 upon the control grid electrode of the triode 502. Any change in the relative value of the anode-cathode currents of the triodes 501 and 502, as may be caused by a change in the relative value of the grid voltages in the two triodes results in a corresponding change in the voltage at the point 509 in the common cathode circuit of the triodes. The point 509 is connected to the control grid electrode of a pentode 510. The anode of the pentode 510 is connected in turn to the control grid electrode of a cathode follower triode 511, the cathode of which is connected in turn to the grid control grid electrode of another cathode follower triode 512. An adjustable selected point 513 in the cathode circuit of the triode 512 is connected by the conductor 430 to the base electrode of the transistor 400.

Another comparison device is provided comprising a pair of transistors 514 and 515 connected to the winding 508 of the transformer 507. The base electrode of the transistor 514 is connected to the movable contactor of the potentiometer 516 connected in turn between the conductor 332 and ground. The base electrode of the transistor 515 is controlled in voltage by the cathode follower triode 511 through an intermediary cathode follower triode 517 through connections whereby the cathode of the triode 511 is connected to the control grid electrode of the triode 517 and the cathode of the triode 517 is connected in turn to the base electrode of the transistor 515. Parallel circuits extend from the +16 volt terminal to ground, one going through a load resistor 518, and the emitter-collector path of the transistor 514, and the other going through a load resistor 519 and the emitter-collector path of the transistor 515. The two ends of the winding 508 of the transformer 507 are connected to the respective emitter terminals of the transistors 514 and 515, so that transient differences between the emitter-collector currents in the two transistors may cause a supplemental increment in one polarity or the other to be added by the transformer winding 506 to the voltage impressed upon the grid control electrode of the triode 502 by the conductor 332.

The function of the comparison circuit comprising the transistors 514 and 515 and the transformer 507 is similar to that of circuits shown and described in an application of William J. Greene, Ser. No. 57,736, filed Sept. 22, 1960, now Patent No. 3,114,101, assigned to the same assignee as the present application. The Greene application relates to the problem of compensating for the inherent delay in the response of a power supply, such as a magnetic amplifier-rectifier, to a control wave or demand signal when a sudden change of power output is demanded of the power supply. In the magnetic amplifier-rectifier a delay of about one-half cycle occurs between the time a change is made in the control current in the winding of a saturable reactor and the time when the new value of power output from the amplifier-rectifier determined by the changed value of control current becomes effective. In the case of a 60 cycle per second power line feeding the magnetic amplifier-rectifier the inherent delay, or dead time as it is sometimes called, is about $1\frac{1}{120}$ of a second. In the circuit of FIGS. 2 through 5, when a sudden change occurs in the voltage impressed upon the control grid of the triode 501, because of the dead time the feedback voltage on the conductor 332 does not change immediately. There is, however, a rapid change in the voltage fed over the conductor 430 to the base of the transistor 400 to make ready the change in power output to become effective in the magnetic amplifier-rectifier at the expiration of the dead time. There is a corresponding rapid change in the voltage fed to the base electrode of the transistor 515, thereby unbalancing the currents in the emitter-collector circuits of the transistors 514 and 515 and sending a transient pulse through the transformer 507 to the control grid electrode of the triode 502 superimposed upon the voltage on the conductor 332. The transient pulse is arranged to be in the direction necessary to offset the unbalance between the control grid electrodes of the triodes 501 and 502, thereby preventing undesirable hunting or run-away conditions from developing. The duration of the transient effect may be regulated by proportioning the resistance values of the load resistors 518 and 519 to the inductance of the winding 508 so that when the transient effect has passed, the magnetic amplifier-rectifier will have completed its dead time period and the required new value of feedback voltage will be present upon the conductor 332, thereby maintaining the approximate balance in the triodes 501 and 502 both during and after the transition from one required power output value to the next.

The overall operation of the system disclosed in FIGS. 2 through 5 will now be described with reference to the flow sheet shown in FIG. 1. Polyphase power from source 20 has its frequency multiplied and its wave form converted to substantially square wave form in power supply unit 22, which unit supplies single phase power to the work circuit 24. The amplitude of the power output of the unit 22 is controlled by means of the control direct current supplied to the control windings 54', 55', 64', 65', 74' and 75' in the unit 22 from the polyphase low power full wave rectifier unit 26. In this control feature, the current output of the unit 22 varies substantially in direct proportion to the amplitude of the direct current control. The amplitude of the control direct current supplied by the unit 26 is in turn controlled by the polyphase firing circuit 28. More specifically, the amplitude of the control direct current supplied by the unit 26 is varied by controlling the time phase of the power cycle at which the controlled rectifiers in the unit 26 are fired. These rectifiers are fired by currents passed by windings of saturable reactors contained in the firing circuit 28. These saturable reactors are biased and require a certain period of time to overcome the bias before they can fire. The degree of this bias is governed by the magnitude of a biasing current which in turn is controlled by passing the biasing current through a transistor the current through which transistor is controlled by varying the voltage applied to the base electrode of the transistor.

In order to program the power delivered from the power source to the work circuit, a continuous sample is taken of the control direct current passing from the rectifier unit 26 to the power supply unit 22. This sample is continuously compared, in the comparison circuit 32 with a program wave from the program wave source 34. A small unbalance is maintained between the two waves compared in the comparison circuit 32, which unbalance wave is applied to the transistor 400 to maintain the desired amount of control direct current which will cause the power source to deliver the desired power to the work circuit as called for by the program wave. The feedback loop 30 forces the firing circuit 28 to vary its control over the rectifier unit 26 in such manner as to conform to changes in the power requirement of the work circuit as determined by the program wave.

An illustrative form of the alternative feedback path 35 is shown in FIGS. 2 and 3. A load current sensor is provided in the form of a current transformer 150 having preferably a single turn primary winding and a secondary winding of many turns. The secondary winding of the transformer 150 is connected through a full-wave rectifier 151 and thence over a lead 152 and through a unidirectional conductor such as a diode 153 to the feedback conductor 332. When the feedback path 35 is used in conjunction with the feedback path 31, a diode 154 is inserted in the feedback conductor 332 as shown in FIG. 3. In case feedback path 35 is used alone it is connected to conductor 332 and diode 153 is omitted. In this case, the current sensing transformers 322 and 323, and rectifier 331 are also omitted. In case feedback path 31 is used alone, it is connected to conductor 332 and diode 154 is omitted. When both feedback paths are used in conjunction, the diodes 153 and 154 serve as a pair of opposed check valves so that if either diode is forced into the conductive condition by an overpowering impressed voltage, the other diode is rendered non-conducting in known manner.

At start-up, there is no current in the load circuit and hence no feedback potential is impressed upon the diode 153 in path 35. During operation and at start-up there is always a current in the transformers 322 and 323 and as a consequence there is a material potential impressed upon the diode 154 in path 31. Thus, at start-up the starting current is controlled to the pre-set starting value by means of the feedback path 31. When the starting current has been established, the feedback potential in the path 35 rises and applies a potential to the diode 153. The system is preferably so designed that after start-up the feedback in path 35 prevails over that in path 31 so that regulation of the load current is normally controlled by the feedback that is directly sensitive to the load current. Experience has shown that either path 35 or path 31 alone provides adequate self-regulation with respect to load current variations, but that self-regulation with respect to power line voltage variations is improved when path 35 is effective over the self-regulation obtained when path 31 is effective. But path 35 is not effective immediately at start-up and so a combination of the two paths is desirable and is automatically effective by a check valve system such as that shown.

The output of the power supply unit 22 which is impressed upon the work circuit 24 under the control of the program wave from the program wave source 34 is a single-phase alternating current power wave of substantially square wave form, having a frequency of alternation that is an integral multiple of the frequency of the power source 20, and having an amplitude that follows closely the amplitude variations in the program wave.

The disclosed combination of the feedback loop 30, power supply unit 22, rectifier 26, firing circuit 28 and comparison circuit 32 is capable of relatively rapid response to variations in the voltage wave from the program wave source 34, usually within a few cycles of power line frequency.

The operation of the circuits of FIG. 2 to accomplish frequency multiplication and square wave shaping will now be described with reference to FIGS. 7 through 11.

Figure 7:
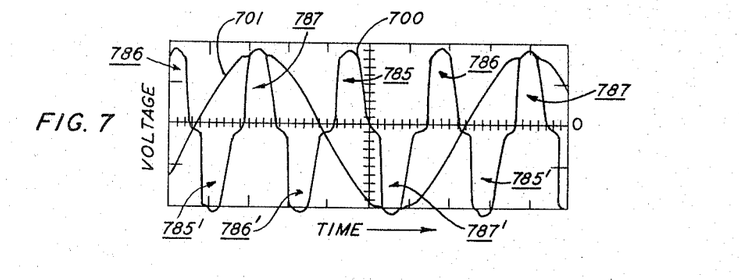
FIGS. 7 through 11 are graphs useful in explaining the operation of the frequency multiplying and square wave forming features of the apparatus shown in FIG. 2.

FIG. 7 shows in curve 700 the no-load secondary voltage wave across the serial combination of the power secondary windings 81, 82, 83, compared in amplitude and phase with the power line voltage wave in phase A, i.e., between power line 41 and power line 42, as represented in curve 701. With reference to a three-phase, 60 cycle per second primary power source, the frequency of the wave represented by curve 701 is 60 cycles per second, and with reference to a frequency tripling scheme the frequency of the wave represented by curve 700 is 180 cycles per second. The lobes of the curve 700 are produced in rotation by the cores 85, 86, 87, and are marked in the figure as positive lobes 785, 786, and 787, respectively, and negative lobes 785', 786', and 787', respectively, the core 85 generating the lobes 785 and 785', and similarly for the cores 86 and 87. Under no-load condition, the various transformer windings act substantially like pure inductances, of high inductance value when unsaturated and of low inductance value when saturated. So, the no-load current flowing in phase A lags substantially 90 degrees behind the voltage wave 701 for that phase, with low current values existing in the neighborhood of the maximum and minimum points of the wave 701. Low current here corresponds to the condition of an unsaturated core, with changing flux resulting in voltage generation in all the windings coupled to the core. Of particular interest here is the voltage generated in the core 87 in the winding 71. While voltage is being generated in the winding 71, the cores 85 and 86 are saturated, and the primary currents then flowing in windings 73 and 72 have substantially no net effect at this time upon the flux in core 87. The flux change in core 87 also generates voltage in the power secondary winding 83, and in the case of unity turns ratio, which condition is represented in FIG. 7, there are equal voltages generated in windings 71 and 83. Thus, during the interval of time when the core 87 is unsaturated, the no-load secondary voltage represented by lobe 787 coincides with wave 701. Before and after the appearance of the lobe 787, the core 87 is saturated. The secondary winding 83 contributes voltage to the power secondary circuit only during those intervals represented by the lobes 787 and 787'.

When the voltage in phase B is near maximum value, the secondary winding 82 contributes voltage to the power secondary circuit as indicated by the lobes 786 and 786'. Similarly, when the voltage in phase C is near maximum value, the secondary winding 81 contributes voltage to the power secondary circuit as indicated by the lobes 785 and 785'. The succession of lobes, in the case illustrated by FIG. 7, is in the order 787, 786', 785, 787', 786, 785', as shown in the figure.

Figure 8:
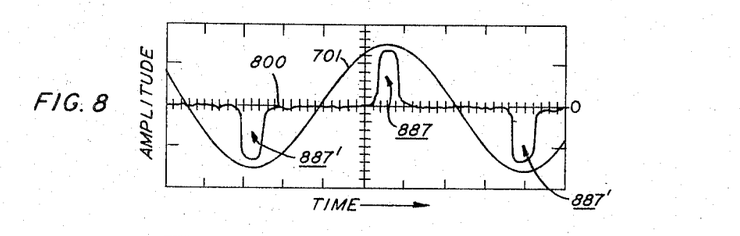

FIG. 8 shows in curve 800, under no-load condition, for phase A, the secondary voltage across power secondary winding 83 also, compared as in FIG. 7 in amplitude and phase with the power line voltage wave as represented by curve 701. Positive and negative lobes 887 and 887' respectively alternate with each other and as in FIG. 7 are centered with repect to the positive and negative half cycles of the curve 701. The phase relationship of lobe 887 to curve 701 is an in-phase relationship the same as between lobe 787 and curve 701 in FIG. 7, and the phase relationship of lobe 887' to curve 701 is likewise an in-phase relationship the same as between lobe 787' and curve 701 in FIG. 7.

Figure 9:
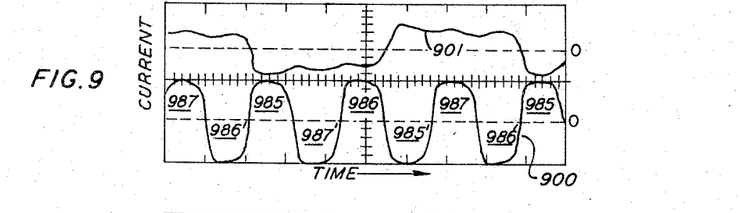

FIG. 9 shows in curve 900, under load condition, the secondary voltage wave across the serial combination of the power secondary windings 81, 82, 83, compared in respect to phase with the primary current in phase A, i.e., through the windings 51, 61, 71, 54 and 55 as represented in curve 901. The curve 900 is formed from the combination of the lobes 887 and 887' shown in FIG. 8 together with similar lobes 985 and 985' contributed by core 85 and similar lobes 986 and 986' contributed by core 86. It will be evident from an examination of FIG. 9 that for the purpose of frequency tripling it is desirable that the transformer with core 85 be so designed that with the given impressed electromotive force, the core 85 shall be saturated at all times except for periods of one-sixth cycle duration occurring once in each half cycle, and similarly for the transformers with cores 86 and 87 respectively. Then, as illustrated in FIG. 9, the current lobes are of full amplitude each over substantially a full sixth of a cycle of the power source, with steep sides and flat tops. The accompanying primary current shown in curve 901 is substantially a flat topped square-type wave, each lobe of which is of full amplitude over substantially one half of a cycle of the power source. The curve 901 contains small ripples corresponding to the triple frequency pulsations of the secondary current. It will be noted that the lobe 987 is substantially centered with respect to the positive lobe of the curve 901 and that the lobe 987' is substantially centered with respect to the negative lobe of the curve 901.

The saturable cores 85, 86, 87, for the power transformers are all preferably so designed in relationship to the impressed wave of electromotive force that, referring particularly to phase A for definiteness, the number of volt-seconds represented by the area under the lobe 887 in FIG. 8 is just sufficient to change the flux in the core from sauration value in one direction to saturation value in the reverse direction.

The power primary windings 53, 62 and 71 during their intervals of unsaturation induce electromotive forces in the respective power secondary windings 81, 82 and 83. These secondary windings are serially connected to each other and to the load circuit in like polarity. The resultant current wave in the load circuit under load condition is shown at 900 in FIG. 9. The result is a substantially square topped wave having three times the frequency of the power source. During successive 60 degree phase intervals, the power primary windings act in succession to generate power pulses in the load circuit in the order shown: a negative pulse 986' from winding 62, a positive from winding 53, a negative from winding 71, a positive from winding 62, a negative from winding 53, a positive from winding 71, whereupon the cycle repeats itself over and over.

Because the secondary windings 81, 82, and 83 are connected serially and in like polarity to the work circuit, power pulses are delivered to the work circuit at three times the frequency of the power source, for example at 180 cycles per second for the usual power source operating at 60 cycles per second.

Figure 10:
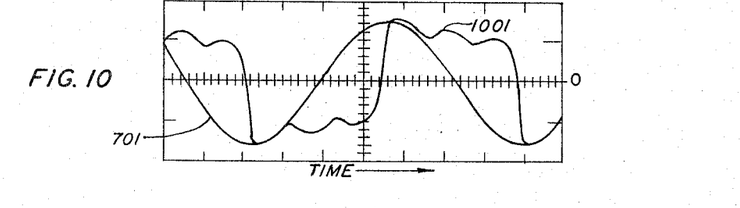

FIG. 10 shows under load condition the phase relationship between the primary current in one phase, for example phase A, represented by curve 1001, which does not differ significantly from curve 901 of FIG. 9, and the primary voltage in the same phase, represented by curve 701 which is the same as appears in FIGS. 7 and 8. It will be noted that the phase current lags the phase voltage by 90 degrees as is to be expected due to the inductive nature of the circuit.

It will be noted that each of the phases A, B and C includes two additional saturable core transformers individual to the respective phases. These transformers will be termed current limiting transformers. In phase A, the current limiting transformers comprise one with current limiting winding 54 and biasing winding 54' and a second with current limiting winding 55 and biasing winding 55'. In phase B, they comprise one with current limiting winding 64 and control winding 64' and a second with current limiting winding 65 and control winding 65'. In phase C, they comprise one with current limiting winding 74 and control winding 74' and a second with current limiting winding 75 and control winding 75'. As indicated by the dot convention, current limiting windings 54 and 55 are serially connected in such relative polarity that a current in phase A tends to generate mutually opposing back electromotive forces in that phase due to the presence in the circuit of the two current limiting transformers. The pairs of current limiting windings in phases B and C are similarly connected. The control windings are connected together and to the source of control current in such polarity that a unidirectional current is sent continuously through all the control windings in such direction as to aid the magnetizing effect of the power phase current in one current limiting winding of each said pair of current limiting windings and to oppose the magnetizing effect in the other current limiting winding of the same pair.

The control current determines an initial value of flux in the saturable core of each of the current limiting transformers, depending upon the amplitude of the control current. A phase current in either direction through the current limiting windings of a said pair of current limiting transformers, due to the relative polarities of connection of the various windings, tends to desaturate the core of one transformer of the pair aid to drive the core of the other transformer of the pair further into saturation. The transformer that becomes unsaturated experiences a material flux change and so generates back electromotive force which opposes the phase current. By this means, the phase current is limited by the control current to a value depending upon the relative number of ampere-turns in the two windings of the unsaturated transformer in accordance with the well known law of equal ampere-turns. Whichever the direction of the phase current, one or the other of the current limiting transformers becomes unsaturated to limit the phase current. By varying the control current, the limiting value of the phase current may be varied accordingly.

In each phase interval during which one of the cores 85, 86 or 87 is undergoing considerable flux change, due to the action of winding 53, 62 or 71 respectively, there is at the same time a certain one of the current limiting transformers likewise undergoing considerable flux change. In the case of winding 71, one or the other of transformer 54–54' or transformer 55–55' is the one that is unsaturated and is therefore undergoing considerable flux change. As the dot convention indicates in FIG. 2, and with the phase polarity as indicated, during the positive half cycle in phase A, transformer 55–55' is unsaturated while transformer 54–54' is saturated and is not undergoing significant flux change. During the negative half cycle in phase A, transformer 54–54' is unsaturated and transformer 55–55' is saturated. In phase B, as shown in FIG. 2, it is transformer 65–65' that is unsaturated and transformer 64–64' that is saturated during the positive half cycle of that phase. Accordingly, during the negative half cycle of phase B, transformer 64–64' is unsaturated and transformer 65–65' is saturated. Similarly, during the positive half cycle in phase C, transformer 75–75' is unsaturated and transformer 74–74' is saturated; and during the negative half cycle it is transformer 74–74' that is unsaturated and transformer 75–75' that is saturated.

The manner in which the unsaturated current limiting transformer 55–55' acts to control the amplitude of the load current during the phase interval in which the winding 71 is also unsaturated will now be described. The control direct current in the winding 55' is of such value as to limit the current in the winding 55 to a predetermined desired value. This value of current in winding 55 is maintained substantially constant over substantially a half cycle, forming a substantially flat topped half wave of primary phase current. During this half cycle, the flux linked with the windings 55 and 55' is gradually reduced from saturation value to zero, reversed to a value somewhat short of saturation in the opposite sense, and then again reduces to zero, reverses and is brought back to saturation in the original sense. The amplitude of the current that accompanies this flux change depends upon the value of the control current, the ampere-turns of current in winding 55 being maintained equal to the ampere-turns in the winding 55' due to the transformer action which takes place while the core of the transformer is unsaturated. Thus, the larger the control current, the more current flows in the winding 55. During the remaining half cycle, the core coupled to windings 54 and 54' becomes unsaturated and current flows in winding 54 under the control of the current in winding 54', thus extending the control of the primary phase current over substantially the complete power cycle.

The impressed electromotive force is preferably made sufficiently great to provide the maximum current required when the control current is set at the value corresponding to full load current for the power supply unit. Lesser values of load current are then obtainable by decreasing the control current to the desired degree, thereby in effect increasing the impedance in the power circuit and limiting the current in the windings 71, 54 and 55 to the desired value.

During the unsaturated intervals of the core 85, the windings 53 and 81 are coupled together as a transformer delivering power to the load circuit. As the current in winding 53 is limited as above described, the current in the power secondary winding 81 is also limited by the law of equal ampere-turns.

Figure 11:
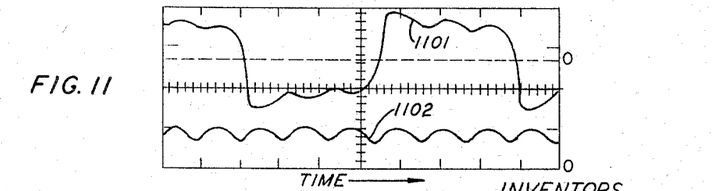

FIG. 11 shows, under condition, in curve 1101 the primary current in one phase, which curve does not differ significantly from either curve 901 or curve 1001. The curve 1101 is compared as to phase with a curve 1102 which latter represents the direct current control current in the current balancing transformers in that phase. Curve 1101 may for example, represent the current in winding 74 and the curve 1102 the current in winding 74'. The curve 1102 shows a 360 cycle per second frequency ripple which is produced in the control winding 74' by the three-phase summation of induced 120 cycles per second ripple from each set of current-balancing reactors. The amplitude of the curve 1101 is controlled by the amplitude of the curve 1102 in such manner that any change in the amplitude of curve 1102 results in a proportionate change in the amplitude of curve 1101. For example, if the direct current control current is doubled, the amplitude of the primary current will be doubled, and likewise the amplitude of the power secondary current as represented in curve 900 in FIG. 9 will also be doubled, thereby providing a means for programming the applicaion of the power supply to the work circuit.

Figure 12:
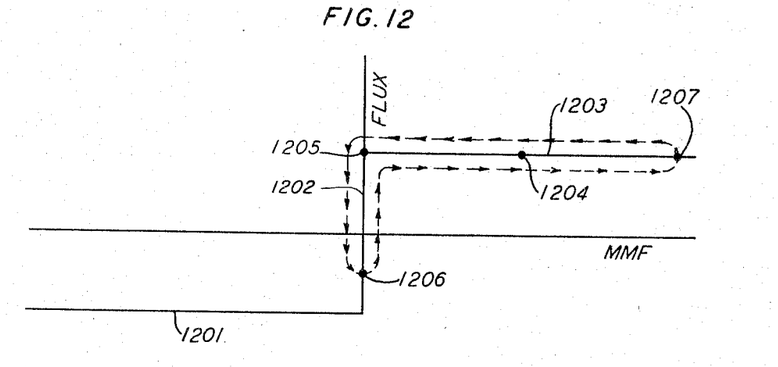
FIGS. 12 and 13 are graphs useful in explaining the current limiting and programming features of the apparatus shown in FIG. 2.

The current limiting and programming features of the frequency multiplier and square wave power supply 22 will now be described with reference to a highly idealized flux versus magnetomotive force (M.M.F.) characteristic diagram of a saturable reactor as shown in FIG. 12. The diagram comprises three essentially straight line portions: a negative saturation branch 1201 along which applied magnetomotive force may be changed in value quite freely without causing significant flux change, a substantially vertical portion 1202 along which flux changes may occur without significant accompanying change in magnetomotive force, and a positive saturation branch 1203 along which applied magnetomotive force also may be changed without causing significant flux change.

Figure 13:
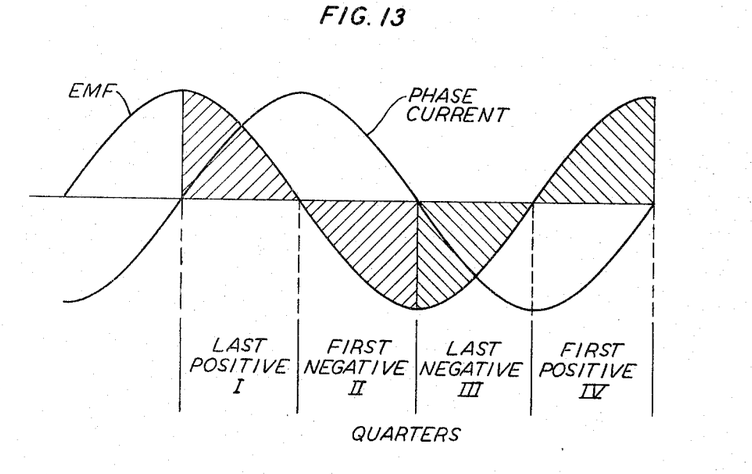

In any one of the current-limiting transformers, for example the transformer comprising windings 55 and 55', a current in either winding develops an accompanying magnetomotive force in the saturable core. Magnetomotive forces in the two windings may either aid or oppose each other according to the relative directions of the currents, as expressed in FIG. 2 by means of the dot convention applied to the windings. Whether the core is saturated or unsaturated at a given time, the current in the winding 55 is produced in response to the electromotive force in phase A and is essentially lagging the electromotive force by 90 degrees, as indicated diagrammatically in FIG. 13. For reference in connection with FIG. 12, the quarter cycles of the electromotive force are numbered I, II, III and IV. During the quarters I and II, the phase current is positive. Quarter I may be described as the last positive quarter of a cycle of impressed electromotive force, II as the first negative quarter, III as the last negative quarter, and IV as the first positive quarter.

Referring to FIG. 2, it will be seen that when the phase current in phase A is positive, the magnetomotive force produced by winding 55, by the dot convention, opposes the magnetomotive force produced by the control current in winding 55'. This opposing relationship exists during quarters I and II. The control current in the winding 55' determines an initial positive value of magnetomotive force and flux represented by the point 1204 in FIG. 12. As positive phase current is forced through the winding 55 the magnetomotive force at first decreases rather rapidly because the core is saturated and current in the winding 55 is limited only by the total impedance in the path of the current. When the current in the winding 55 has brought the magnetomotive force essentially to zero as represented by the point 1205, the core becomes unsaturated; after which the flux must be opposed, annulled and finally reversed toward negative saturation before either the current or the magnetomotive force can respond further to the driving electromotive force to any significant degree. The reactor core and the source of electromotive force are relatively so designed, however, that before negative saturation is reached the direction of the electromotive force will be reversed. In practice, the flux will be reversed part way toward negative saturation, for example as represented by the point 1206, whereupon the flux will be brought back over a period of time to positive saturation again, at the point 1205. Next, the current will rather rapidly bring the core back to the condition at point 1204. The course of the state of the core during quarters I and II is represented by solid arrows.

When the phase current in phase A is negative, the magnetomotive force produced by winding 55, by the dot convention, aids the magnetomotive force produced by the control current in the winding 55'. This aiding relationship exists during quarters III and IV. The phase current in this case drives the core further into positive saturation, without materially changing the value of the flux, to arrive at the point 1207 at the peak of phase current and to return to point 1204 as the phase current recedes to zero. The course of the state of the core during quarters III and IV is represented by dotted arrows on the diagram of FIG. 12. The magnetomotive force at point 1207 is substantially double that at point 1204.

Conditions in the transformer comprising the windings 54 and 54' are the reverse of those in the transformer comprising windings 55 and 55'. When the phase current in phase A is positive, the magnetomotive force produced by winding 54, as indicated by the dot convention, aids the magnetomotive force produced by the control current in winding 54'. This relationship exists during quarters I and II. The course of the state of the core coupled to the winding 54 and 54' is similar to that described in connection with the windings 55 and 55' and is the course at the phase shown by dotted arrows in FIG. 12. During quarters III and IV, the course of the state of the core coupled to the windings 54 and 54' is the course shown by solid arrows in FIG. 12.

A starting and stopping circuit may be provided for controlling the system, as shown in FIG. 2. For this purpose, power may be taken from one phase of the polyphase power supply through a voltage step-down transformer 600 and a switch 601 as shown. Closure of the switch 601 extends power to an amber signal lamp 602, signifying that the main power is on, a ventilating fan 603, and a time delay relay winding 604. After a suitable time delay period, such for example as 60 seconds, the relay winding 604 effects the closure of a contact 605 which extends the power to a green signal lamp 606, signifying that the system is ready for welding, and to a spring-opened push button contactor 607. Momentary manual closure of the push button contactor 607 extends power to a red signal lamp, 608, signifying that the welding circuit is conditioned for use, and to the relay winding 100. Energization of the relay winding 100 completes a holding circuit for this relay winding as well as for the signal lamp 608 through a spring-closed push button contactor 609, and a normally open contact 104 closed by the actuation of the winding 100 so that the push button 607 need not be held down more than momentarily. Actuation of the winding 100 connects polyphase power to the frequency multiplier and power supply unit 22 through the contactors 101, 102 and 103.

To shut down the system either in an emergency or at the end of a welding operation, the push button contactor 609 may be opened manually by momentarily pressing the button. This operation breaks the holding circuit of the relay winding 100, cutting off the main power to the system.

It will be understood that, while in the embodiment of the invention shown herein, power for energizing the rectifier 26, the firing circuit 28 and the comparison circuit 32 is derived from the same power source 20 from which the output power is provided for the work circuit 24, separate or independent power sources may be provided as desired for the rectifier, the firing circuit or the comparison circuit.

While illustrative forms of apparatus and methods in accordance with the invention have been described and shown herein, it will be understood that numerous changes may be made without departing from the general principles and scope of the invention.

We claim:

1. A system for converting polyphase alternating current power of a given frequency into single phase square-type wave power of a frequency which is a multiple of said given frequency and of amplitude which is variable in accordance with variations in a given program wave, which system comprises a plurality of saturable core power transformers equal in number to the number of phases of the polyphase power circuit, each said power transformer having a plurality of primary windings equal in number to the number of phases and each said primary winding being connected to a different phase of the polyphase power circuit, and each said power transformer having a secondary winding, means connecting all the said secondary windings in series aiding relationship to each other and to a load circuit; and a plurality of saturable core current limiting transformers equal in number to twice the number of phases, each said current limiting transformer having a current limiting winding and a control winding, said current limiting windings being connected in pairs, two said current limiting windings being in series with each other in each phase of the polyphase power circuit in such relative polarity that a current in a given phase tends to generate mutually opposing back electromotive forces in that phase, means to send unidirectional current continuously through all the said control windings in such direction as to aid the magnetizing effect of the power phase current in one current limiting winding of each said pair of current limiting windings and to oppose the magnetizing effect in the other winding of the same pair; and means to vary the amplitude of the said unidirectional current in accordance with variations in the said program wave.

2. In an alternating current supply system for electric arc welding, in combination, a combined frequency multiplier and square wave generator operatively interposed between a polyphase power source and the work circuit of an electric welding arc, said combined multiplier and generator including a plurality of saturable transformer cores effective to control the amplitude of the current delivered by the combined device to the work circuit, a polyphase rectifier energized by the polyphase power source to produce a control direct current for controlling the effectiveness of said saturable cores, a polyphase firing circuit energized by said polyphase power source for controlling the direct current output of the said rectifier, means to generate a voltage wave proportional to the direct current output of the rectifier, means to compare said voltage wave with a given program voltage wave to produce an error voltage wave, and means to control the firing of the said firing circuit in response to variations in the error voltage wave, whereby the direct current output of the rectifier is continuously made to follow variations in the program voltage wave to make the current supplied to the electric arc work circuit in turn follow variations in the program wave.

3. In a power supply system for alternating current electric arc welding, in combination, a combined frequency multiplying and square wave forming device interposed between a polyphase power source and the load circuit of an electric welding arc, said combined device being controllable as to amplitude by means of direct current biasing, a polyphase rectifier for supplying direct current for biasing said combined multiplying and square wave forming device to control the amplitude of alternating current delivered by said device to the load circuit, said rectifier including firing elements which by variable delay in firing serve to vary correspondingly the direct current output of the full wave rectifier, a polyphase firing circuit including saturable magnetic cores, for firing the said firing elements of the rectifier at selected times, which times are controllable by controlling in turn a biasing magnetomotive force impressed upon said saturable cores, means to generate a measuring voltage proportional to the direct current output of the rectifier, means to compare said measuring voltage continuously with a variable given program voltage to produce an error voltage, means utilizing said error voltage to produce a variable biasing magnetomotive force for biasing the said saturable cores in the said firing circuit, whereby the firing times in the rectifier are controlled by said biasing magnetomotive force and the direct current output of the rectifier is in turn controlled with the result that the amplitude of current delivered to the load circuit follows variations in the said given program voltage.

4. In an alternating current power supply, in combination, a polyphase power source, a first plurality of saturable transformer cores, each core in said first plurality of cores being coupled to a power primary winding connected to and individual to one phase of the polyphase power source, additional windings coupled to each core in said plurality of cores, each said additional winding coupled to a given core being connected to a different phase of the polyphase power source other than the phase to which the said power primary winding is connected, said additional windings on a given core being connected into the respective power phases in polarity opposite to the polarity of connection of the power primary winding connected to the same phase, a second plurality of saturable transformer cores, comprising pairs of cores, each core coupled to a current limiting winding and a control winding individual thereto, the current limiting windings in each said pair being connected together in series opposing relationship and in serial connection each pair to a different phase of the polyphase power source, means connecting the control windings of all the said second plurality of cores for sending a control current through all said control windings to control the maximum current in all said power primary windings.

5. Apparatus according to claim 4, together with means to generate a control current for energizing said control windings, and means to vary said control current in response to variations in a given program wave.

6. A frequency tripling system for a three-phase power supply, characterized by rapid rise and fall at the beginning and end respectively of each half cycle of the triple frequency and by a sustained relatively high current value over the major portion of each half cycle, said system comprising three power primary windings and two current amplitude control windings in each of the three phases, one said power primary winding in each phase having substantially twice as many turns as either of the two other power primary windings in the same phase, a separate saturable core of a power transformer individual to each phase and coupled to the power primary winding in that phase of the doubled number of turns and to a power primary winding of ordinary numbers of turns in each of the other two phases, individual power secondary winding coupled to each said saturable core, said secondary windings being connected in series aiding relationship to a load curcuit, the power primary winding coupled to any given said saturable core being coupled by the core to the respective secondary winding in reverse polarity to that between the power primary windings of ordinary number of turns and the respective secondary winding; and means individual to and serially connected in each phase to control the current amplitude in the respective phase.

7. Apparatus according to claim 6, in which the said current amplitude control means comprises a pair of magnetically opposed current limiting windings individual to and serially connected in each phase, a plurality of control windings each coupled to a different one of said current limiting windings, and means to impress control current serially upon all of said control windings.

8. A programmable, frequency multiplied square wave power supply comprising,
   in combination,
   a polyphase power source,
   power wave modifying means connected between said polyphase source and a work circuit,
   said wave modifying means being arranged to perform the several functions of a frequency multiplication, conversion of a polyphase power wave to a single phase power wave, wave form squaring and amplitude control, whereby there is produced a substantially square wave of output power at multiplied frequency and controllable to amplitude,
   said amplitude control function being effected by means of a unidirectional control wave of variable amplitude impressed upon said wave modifying means, whereby the amplitude of the square wave is rendered continuously substantially proportional to the amplitude of the said unidirectional control wave,
   a source of unidirectional current controllable as to amplitude connected to said wave modifying means for supplying the required control wave to said wave modifying means,
   control means effective upon said source of unidirectional current for controlling the amplitude of said unidirectional current,
   means to continuously develop a sample wave the amplitude of which is substantially proportional to the amplitude of the said square wave,
   a program wave source for providing a program wave varying in amplitude with time according to a predetermined program,
   a comparison circuit,
   means to impress said sample wave and said program wave substantially simultaneously upon said comparison circuit to develop an error wave,
   said control means for controlling the amplitude of said unidirectional current being controllable in turn by a wave impressed thereon,
   and means to impress said error wave upon said control means for controlling the amplitude of said unidirectional current, whereby the amplitude of said unidirectional control wave is controlled in such manner as to make the amplitude of the said sample wave continuously substantially proportional to the amplitude of the said program wave,
   thereby substantially compelling the amplitude of the said square wave to follow amplitude variations in the said program wave.

9. A programmable, frequency multiplied square wave power supply comprising, in combination, a polyphase power source, power wave modifying means connected between said polyphase source and a work circuit, said wave modifying means being arranged to perform the several functions of frequency multiplication, conversion of a polyphase power wave to a single phase power wave, wave form squaring and amplitude control whereby there is produced a substantially square wave of output power at multiplied frequency and controllable as to amplitude, said amplitude control function being effected by means of a unidirectional control wave of variable amplitude impressed upon said wave modifying means, whereby the amplitude of the square wave is rendered continuously substantially proportional to the amplitude of the said unidirectional control wave, a rectifier controllable as to average amplitude connected to said wave modifying means for supplying the required control wave to said wave modifying means, means to supply alternating current to said rectifier to energize the same, a control circuit connected to said rectifier for controlling the average amplitude of the control wave supplied by said rectifier, means to continuously develop a sample wave the amplitude of which is substantially proportional to the amplitude of the said square wave, a program wave source for providing a program wave varying in amplitude with time according to a predetermined program, a comparison circuit, means to impress said sample wave and said program wave substantially simultaneously upon said comparison circuit to develop an error wave, said control circuit for controlling said controllable rectifier being controllable in turn by a wave impressed thereon, and means to impress said error wave upon said control circuit for said controllable rectifier in negative feedback relationship to effect the said control of said controllable rectifier by way of said control circuit, whereby the amplitude of said unidirectional control wave is controlled in such manner as to make the amplitude of the said sample wave continuously substantially proportional to the amplitude of the said program wave, thereby substantially compelling the amplitude of the said square wave to follow amplitude variations in the said program wave.

No references cited.

JOHN F. COUCH, *Primary Examiner.*

W. H. BEHA, *Assistant Examiner.*